United States Patent
Yanagawa et al.

(10) Patent No.: US 8,534,589 B2
(45) Date of Patent: Sep. 17, 2013

(54) WEBBING TAKE-UP DEVICE

(75) Inventors: Wataru Yanagawa, Aichi-ken (JP); Masaru Ukita, Aichi-ken (JP); Yoshiaki Maekubo, Aichi-ken (JP)

(73) Assignee: Kabushiki Kaisha Tokai-Rika-Denski-Seisakusho, Aichi-ken (JP)

( * ) Notice: Subject to any disclaimer, the term of this patent is extended or adjusted under 35 U.S.C. 154(b) by 226 days.

(21) Appl. No.: 13/158,950

(22) Filed: Jun. 13, 2011

(65) Prior Publication Data

US 2011/0309179 A1    Dec. 22, 2011

(30) Foreign Application Priority Data

Jun. 18, 2010 (JP) .................................. 2010-139982

(51) Int. Cl.
*B65H 75/48* (2006.01)

(52) U.S. Cl.
USPC ....................................... 242/379.1; 242/382

(58) Field of Classification Search
USPC ............. 242/382, 382.5, 383.1, 383.2, 383.5, 242/383.6, 384, 384.1, 379.1; 280/805, 806, 280/807; 297/470–472, 476–478
See application file for complete search history.

(56) References Cited

U.S. PATENT DOCUMENTS

| | | | | |
|---|---|---|---|---|
| 7,731,117 B2 * | 6/2010 | Yasuda et al. | .............. | 242/379.1 |
| 8,240,591 B2 * | 8/2012 | Aihara et al. | .................. | 242/374 |
| 2007/0001047 A1 * | 1/2007 | Yasuda et al. | .............. | 242/379.1 |
| 2008/0087754 A1 * | 4/2008 | Aihara et al. | .................. | 242/374 |

FOREIGN PATENT DOCUMENTS

JP    2007-084042    5/2007

* cited by examiner

*Primary Examiner* — Sang Kim
*Assistant Examiner* — Juan Campos, Jr.
(74) *Attorney, Agent, or Firm* — Roberts Mlotkowski Safran & Cole, P.C.

(57) ABSTRACT

The present invention is to suppress a generation of a noise due to repeatedly hitting a clutch plate against a clutch cover and a clutch guide. A webbing take-up device is provided with a clutch cover fixed to a sub-torsion shaft so as to be rotatable integrally therewith; a clutch guide arranged so as to face the clutch cover, and supported capable of relatively rotating to the sub-torsion shaft; a lock ring formed around the clutch cover and the clutch guide; and a clutch plates turned to a lock ring side while being guided by the clutch guide in accordance with relative rotation of the clutch guide to the clutch cover into one rotational direction, and engaged with the lock ring. L-shaped springs which urge the clutch plates to a clutch cover side are formed integrally with the clutch guide.

2 Claims, 8 Drawing Sheets

WEBBING TAKE-UP DEVICE

CROSS-REFERENCE TO RELATED APPLICATION

This application claims priority under 35 USC 119 from Japanese Patent Application No. 2010-139982 filed Jun. 18, 2010, the disclosure of which is incorporated by reference herein.

BACKGROUND OF THE INVENTION

1. Field of the Invention

The present invention relates to a webbing take-up device.

2. Related Art

In a webbing take-up device disclosed in Japanese Patent Application Laid-Open (JP-A) No. 2007-84042, a torsion shaft is fixed to a spool so as to be rotatable integrally therewith. On one end side of the torsion shaft, a second lock base is fixed so as to be integrally rotatable, and a circular plate is supported so as to be relatively rotatable.

Second lock pawls are turnably supported by the second lock base, and guide pins projecting from the circular plate are movably engaged with elongated holes respectively formed in the second lock pawls.

When a stopper which regulates a relative rotation of the second lock base and the circular plate is retracted so that the circular plate is rotated relatively to the second lock base by an urging force of a spring, the guide pins move in the elongated holes. Further, by this, the second lock pawls are turned to an outside of the second lock base so that the second lock pawls are engaged with a lock ring formed around the second lock pawls.

However, in the webbing take-up device disclosed in JP-A No. 2007-84042 mentioned above, in a case where clearances are formed between the second lock pawl and the second lock base and the circular plate in order to ensure a rotary movement of the second rock pawl, there is a possibility to generate (rattling) noise by repeatedly hitting the second lock pawl against the second lock base and the plate due to, for example, a vibration or the like associated with a vehicle traveling.

SUMMARY OF THE INVENTION

An embodiment of the present invention has been made in terms of the above-mentioned problem, and provides a webbing take-up device capable of suppressing an abnormal noise generated by repeatedly hitting a clutch plate against a clutch cover and a clutch guide.

In order to solve the problems, a webbing take-up device according to the first aspect of the present invention includes: a spool for taking up a webbing belt; a lock unit that is arranged coaxially with the spool, and is fixed to the spool so as to be rotatable integrally with the spool; a clutch cover that is arranged coaxially with the lock unit, and is fixed to the lock unit so as to be rotatable integrally with the lock unit; a clutch guide that is arranged to face the clutch cover in an axial direction of the lock unit, and is supported at the lock unit so as to be rotatable relatively to the lock unit; an engaged section that is formed at an outer side in a radial direction of the clutch cover and the clutch guide; a clutch plate that includes a turning shaft extending along an axial direction of the clutch cover, and is supported at the clutch cover by the turning shaft so as to be turnable, the clutch plate being turned toward a side of the engaged section to be engaged with the engaged section while being guided by the clutch guide in accordance with relative rotation of the clutch guide with respect to the clutch cover in one rotational direction; and an L-shaped spring that is formed integrally with the clutch guide, the L-shaped spring including a first arm section which extends along an axial direction of the clutch guide, and a second arm section which extends from a leading end of the first arm section in a direction orthogonal to the direction in which the first arm section extends, a leading end section of the second arm section being abutted to the clutch plate to urge the clutch plate to a side of the clutch cover.

In the webbing take-up device, when the clutch guide is rotated relatively to the clutch cover into the one rotational direction, the clutch plate is turned to the side of engaged section (engagement-subject section side) in accordance therewith, and is engaged with the engaged section.

In the clutch guide, the L-shaped spring is formed, and the clutch plate is urged by the L-shaped spring toward the clutch cover side. Accordingly, even though clearances are formed between the clutch plate and both the clutch cover and the clutch guide respectively in order to ensure the rotary movement of the clutch plate, it is possible to suppress the abnormal noise generated by repeatedly hitting the clutch plate against the clutch cover and the clutch guide.

In addition, the L-shaped spring is constituted by the first arm section extending along the axial direction of the clutch guide, and the second arm section extending from the leading end of the first arm section into the direction orthogonal to the direction in which the first arm section extends. Accordingly, in comparison with a linear spring, an equivalent deflection length can be secured with a more compact structure.

The webbing take-up device according to the second aspect of the present invention is that, in the webbing take-up device according to the first aspect, an abutting surface of the clutch plate, to which the leading end section of the second aim section is abutted, is directed to a direction opposite to a direction toward a side of the clutch cover and a side of the engaged section.

In the webbing take-up device according to the second aspect, the abut surface of the clutch plate abutting (contacting) with the leading end section of the second arm section is directed to the direction opposite to the direction toward the clutch cover side and the engaged section side. Thus, the clutch plate can be urged by the L-shaped spring toward the clutch cover side and the engaged section side, and hence it is possible to assist the turning of the clutch plate toward the engaged section side.

As described in detail hereinabove, according to the present invention, it is possible to suppress the (rattling) noise generated by repeatedly hitting the clutch plate against the clutch cover and the clutch guide.

BRIEF DESCRIPTION OF THE DRAWINGS

Embodiments of the invention will be described in detail with reference to the following figures, wherein.

DETAILED DESCRIPTION OF THE INVENTION

In the following, description is made of embodiments of the present invention with reference to figures.

Figure 1:
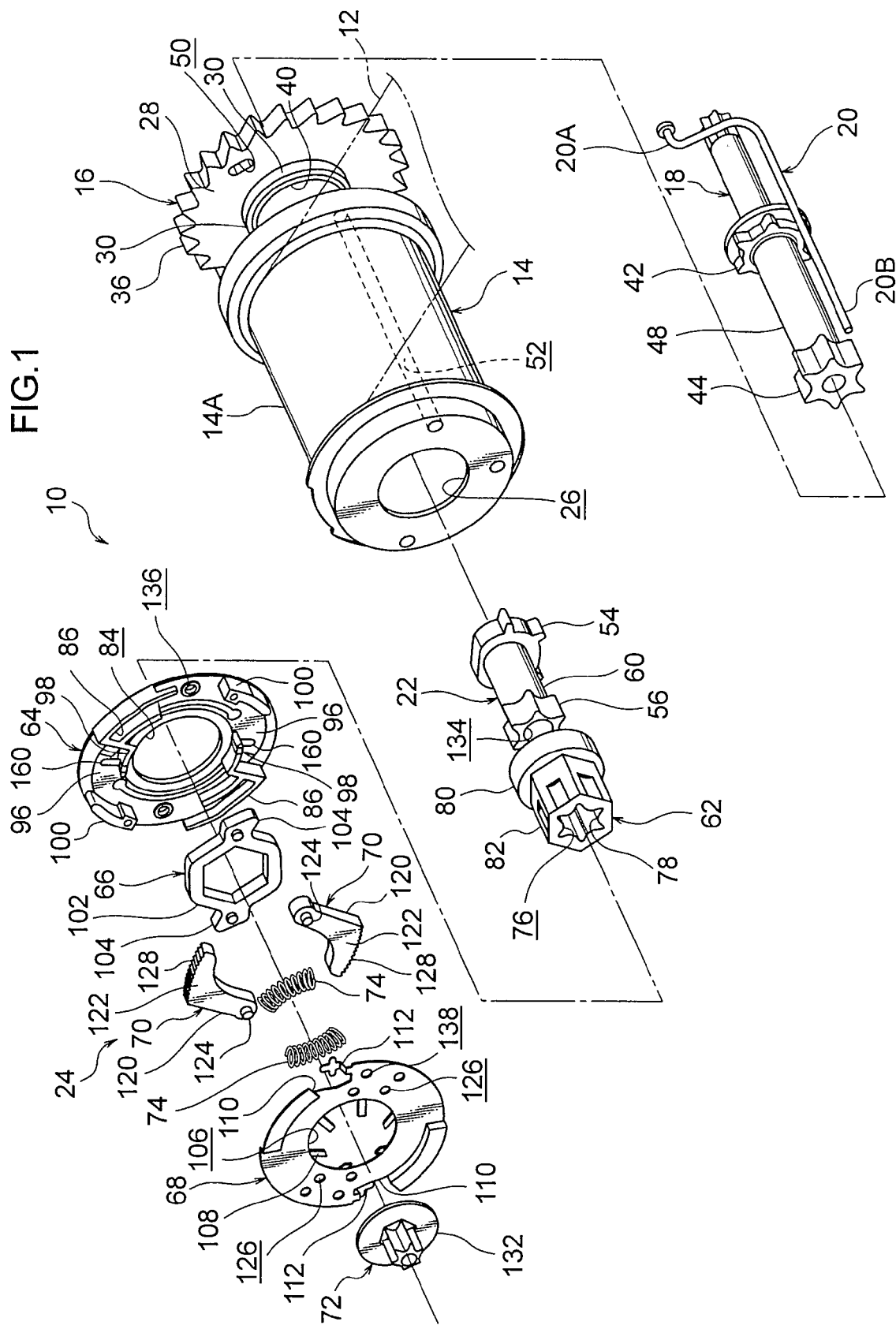
FIG. 1 is an exploded perspective view of a webbing take-up device according to an embodiment of the present invention.

As illustrated in FIG. 1, a webbing take-up device 10 according to an embodiment of the present invention includes a webbing belt 12, a spool 14, a lock gear 16, a main torsion shaft 18, a trigger wire 20, a sub-torsion shaft 22, and a clutch mechanism 24.

The webbing belt 12 is applied to a passenger's body, and a proximal end section thereof is secured (caught or connected) to the spool 14. The spool 14 is formed in such a cylindrical shape as to include a through-hole 26 passing therethrough in an axial direction. When the spool 14 is rotated in a take-up direction as one rotational direction, the spool 14 takes up the webbing belt 12 around an outer peripheral section 14A.

Figure 3:
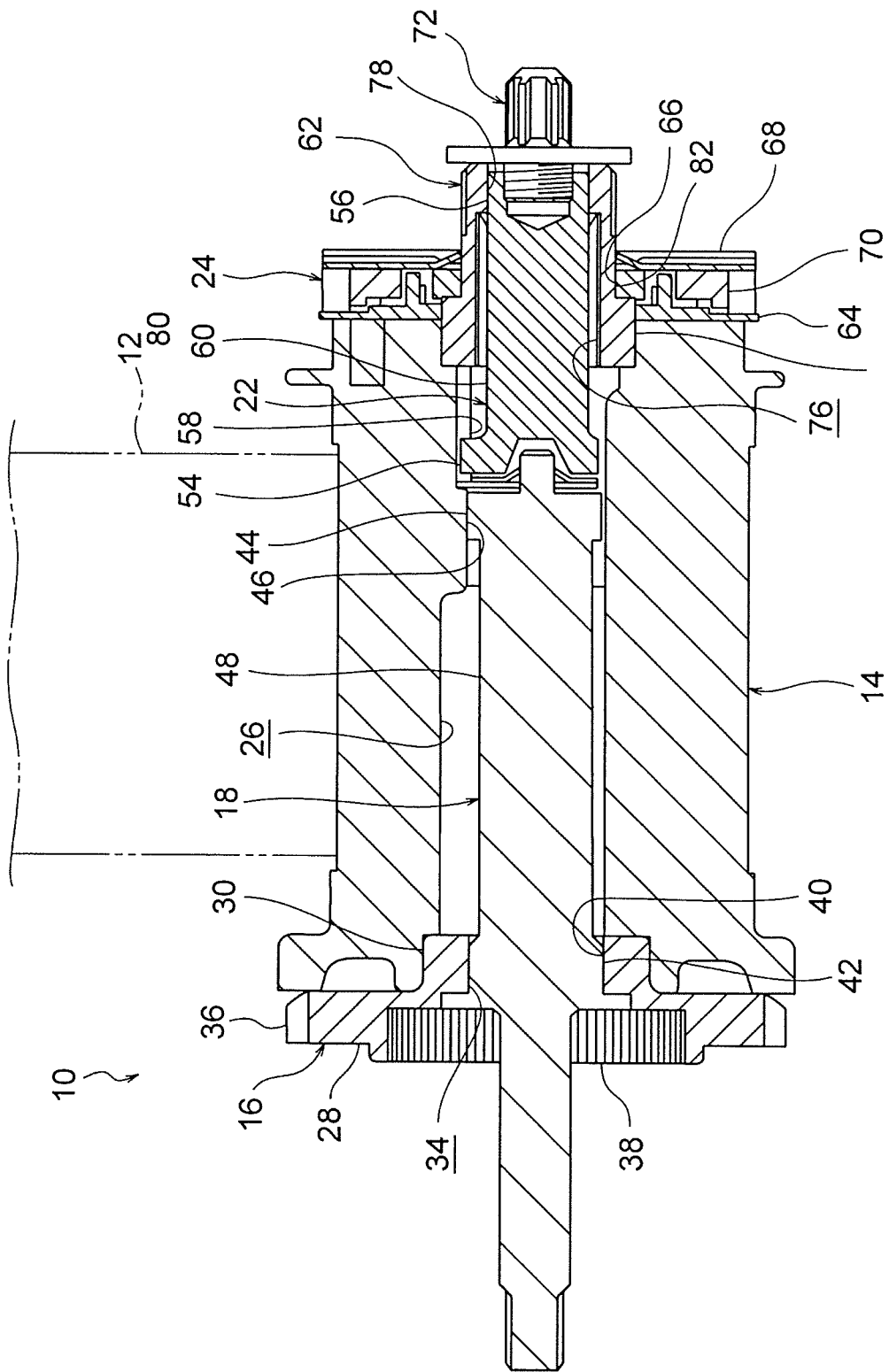
FIG. 3 is a side sectional view of the webbing take-up device illustrated in FIG. 1.

The lock gear 16 is arranged coaxially with the spool 14 on one axial-direction side of the spool 14, and includes a gear body 28 and a projecting section 30 projecting from the gear body 28 to an inside of the spool 14. As illustrated in FIG. 3, in the gear body 28 and the projecting section 30 a through-hole 34 is formed which passes therethrough in the axial direction. Further, the gear body 28 is provided with a gear section 36 formed on an outer peripheral section thereof and a knurled engagement subject section 38 formed on an inner peripheral section thereof. Meanwhile, a spline engagement subject section 40 is formed on an inner peripheral section of the projecting section 30.

The main torsion shaft 18 is arranged coaxially with the spool 14 and the lock gear 16, and inserted in the through-hole 26 of the spool 14 and the through-hole 34 of the lock gear 16. A first engagement section 42 in the form of spline is formed in a longitudinal-direction intermediate section of the main torsion shaft 18, and a second engagement section 44 also in the form of spline is formed on a leading end section of the main torsion shaft 18.

The first engagement section 42 is engaged with the engagement subject section 40 of the lock gear 16, and hence the main torsion shaft 18 is fixed to the lock gear 16 so as to be rotatable integrally therewith. Further, the second engagement section 44 is engaged with an engagement subject section 46 formed on an inner peripheral section of the spool 14, and hence the main torsion shaft 18 is fixed to the spool 14 so as to be rotatable integrally therewith.

A part between the first engagement section 42 and the second engagement section 44 in the main torsion shaft 18 is structured, as described below, as a first energy-absorbing section 48 for absorbing energy for pull of the webbing belt 12.

As illustrated in FIG. 1, the trigger wire 20 is extended along the main torsion shaft 18. A proximal end section 20A of the trigger wire 20 is inserted in a hole section 50 formed at a position on a radially outer side relative to an axial center section of the gear body 28, and is fixed to the gear body 28. Meanwhile, a leading end side relative to the proximal end section 20A of the trigger wire 20 is inserted in a hole section 52 formed in the spool 14 in parallel to the through-hole 26. A leading end section 20B of the trigger wire 20 is projected from the spool 14 to another side in axial-direction.

The sub-torsion shaft 22 is arranged coaxially with the main torsion shaft 18, and a proximal end side relative to a longitudinal-direction intermediate section of the sub-torsion shaft 22 is inserted in the through-hole 26 of the spool 14. Meanwhile, a leading end side relative to the longitudinal-direction intermediate section of the sub-torsion shaft 22 is projected from the spool 14 to the other side in axial-direction.

In the sub-torsion shaft 22, a first engagement section 54 including plural protrusions is formed at a proximal end section of the sub-torsion shaft 22, and a second engagement section 56 in the form of spline is formed at a leading end section of the sub-torsion shaft 22. The first engagement section 54 is engaged with an engagement subject section 58 (refer to FIG. 3) formed on an inner peripheral section of the spool 14. Thereby, the sub-torsion shaft 22 is fixed to the spool 14 so as to be rotatable integrally therewith.

A part between the first engagement section 54 and the second engagement section 56 in the sub-torsion shaft 22 is structured, as described below, as a second energy-absorbing section 60 for absorbing energy for pull of the webbing belt 12.

Figure 2:
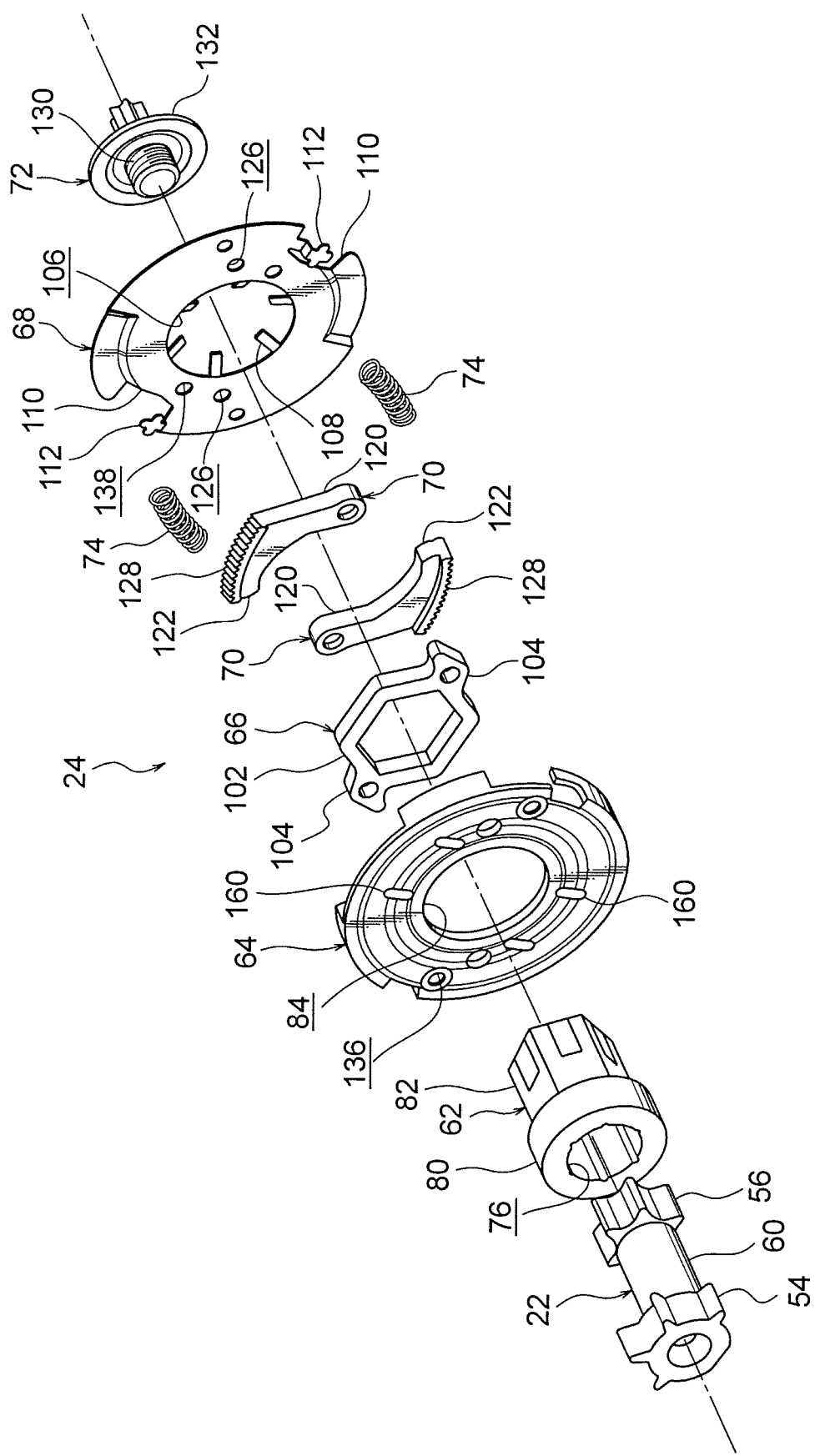
FIG. 2 is an exploded perspective view in which a clutch mechanism illustrated in FIG. 1 is viewed in a direction opposite to that in FIG. 1.

As illustrated in FIGS. 1 and 2, the clutch mechanism 24 includes a sleeve 62, a clutch guide 64, a clutch base 66, a clutch cover 68, a pair of clutch plates 70, a screw 72, and a pair of coil springs 74. Note that, in this embodiment, the sub-torsion shaft 22, the sleeve 62, and the clutch base 66 constitute a lock unit.

The sleeve 62 is arranged coaxially with the sub-torsion shaft 22. A through-hole 76 passing therethrough in the axial direction is formed at an axial center section of the sleeve 62. The above-mentioned sub-torsion shaft 22 is inserted loosely manner in the through-hole 76. Further, an engagement subject section 78 in the form of spline (refer to FIGS. 1 and 3) is formed on a leading end side in an inner peripheral section of the sleeve 62. The second engagement section 56 is engaged with the engagement subject section 78, and hence the sleeve 62 is fixed to the sub-torsion shaft 22 so as to be rotatable integrally therewith.

Further, a proximal end side of the sleeve 62 is formed as a rotation support section 80 having a circular outer shape. A leading end side relative to the rotation support section 80 in the sleeve 62 is formed as a fitting section 82 having a hexagonal outer shape.

The clutch guide 64 is a resin-molded product, and formed in such an annular shape as to have a through-hole 84 passing therethrough in the axial direction. The above-mentioned rotation support section 80 is inserted in the through-hole 84. Thereby, the clutch guide 64 is supported so as to be rotatable relatively to the sleeve 62, and to the sub-torsion shaft 22.

Figure 4:
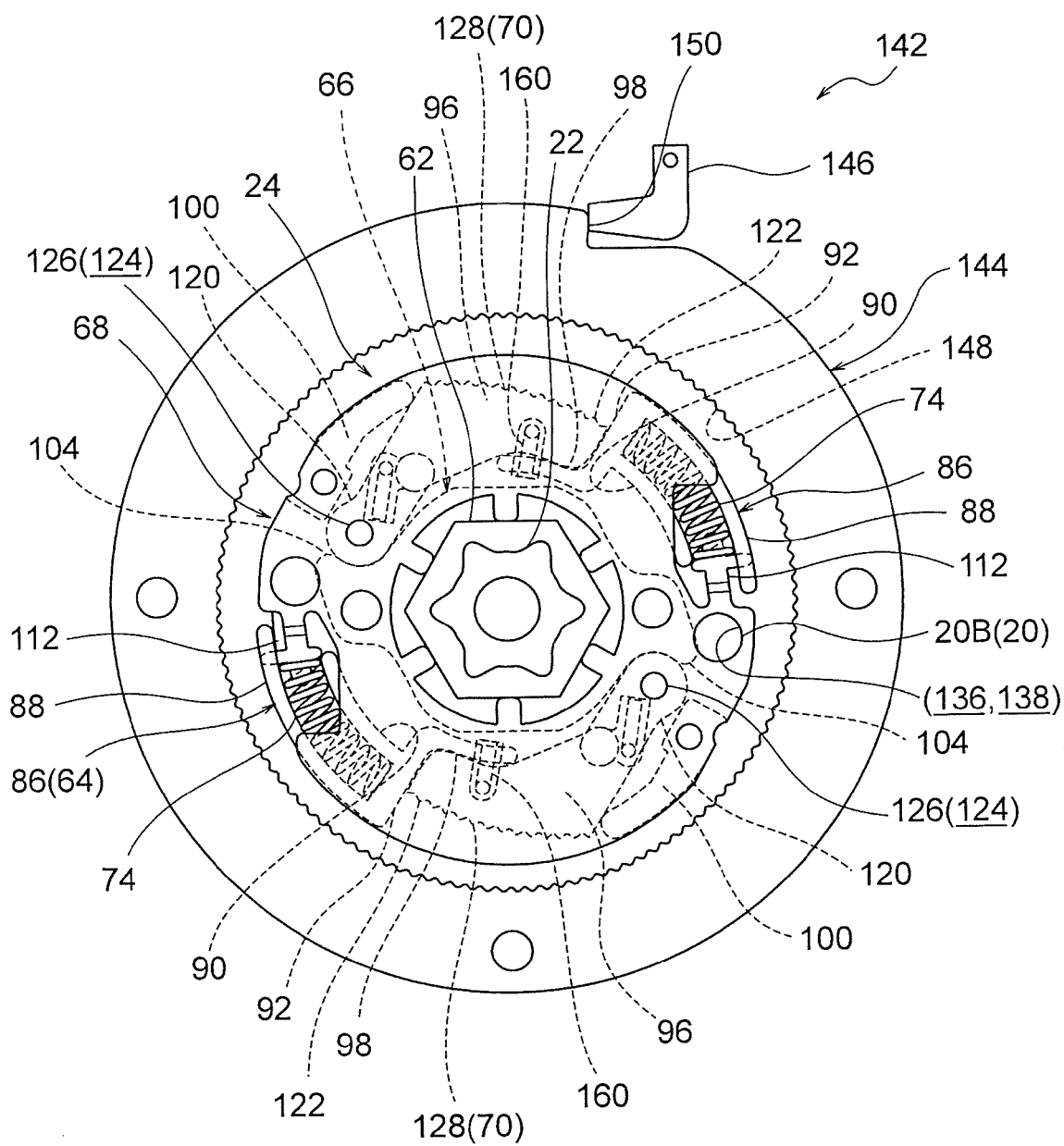
FIG. 4 is a front view of the clutch mechanism illustrated in FIG. 1.

As illustrated in FIG. 4, coil-spring accommodating sections 86 respectively accommodating the coil springs 74 are formed respectively at two points in a circumferential direction in the clutch guide 64. The pair of spring accommodating sections 86 are formed so as to be point-symmetrical with each other with respect to a central section of the clutch guide 64. Each of the spring accommodating sections 86 has such a substantially C-shape as to have an outer-side wall section 88 and an inner-side wall section 90 which extend in the circumferential direction of the clutch guide 64, and a coupling wall section 92 as a first catch (connect) section which extends in a radial direction of the clutch guide 64 and couples respective end sections of the outer-side wall section 88 and the inner-side wall section 90.

Further, in the clutch guide 64, clutch-plate accommodating sections 96 are formed, which are formed adjacent (next) to the coil-spring accommodating sections 86, for respectively accommodating the clutch plates 70. In each of the clutch-plate accommodating sections 96, a first support-wall section 98 is formed to extend from the coupling wall section 92 to a side opposite to the inner-side wall section 90, and a second support-wall section 100 is formed on a side opposite to the outer-side wall section 88 with respect to the coupling wall section 92 while being separated from the coupling wall section 92.

As illustrated in FIGS. 1 and 2, the clutch base 66 includes an annular fitting-subject section 102 having a hexagonal shape. The fitting section 82 is fitted (press-fitted) to an inside of the fitting subject section 102, and hence the clutch base 66 is fixed to the sleeve 62 so as to be rotatable integrally therewith. Further, the clutch base 66 is provided with locking sections 104 projecting from the fitting subject section 102 to an outside. The locking sections 104 are caught (connected) respectively to proximal end sections of arm sections 120 (described later) formed at the clutch plates 70 (refer to FIG. 4).

The clutch cover 68 is arranged coaxially with the sleeve 62, and arranged on a side opposite to the spool 14 with respect to the clutch guide 64 so as to face the clutch guide 64. The clutch cover 68 is formed in such an annular shape as to include a through-hole 106 passing therethrough in the axial direction, and has an inner peripheral section where plural fitting claws 108 projecting to a radial-direction inner side are formed. The above-mentioned fitting section 82 is inserted in the through-hole 106. The plural fitting claws 108 are fitted to the fitting section 82, and hence the clutch cover 68 is fixed to the sleeve 62, and to the sub-torsion shaft 22 so as to be rotatable integrally therewith.

Further, cutout sections 110 each having such a recessed shape in axial-direction view as to open to a radial-direction outer side are formed respectively at the two points in the circumferential direction in the clutch cover 68. In addition, in the clutch cover 68, cross claws 112 are formed so as to be positioned in the respective cutout sections 110 at the inside. The pair of cross claws 112 and the pair of cutout sections 110 are formed to be point-symmetrical with each other with respect to a central section of the clutch cover 68.

The clutch plates 70 are arranged between the clutch cover 68 and the clutch guide 64. Each of the clutch plates 70 includes the arm section 120 and a circular-arc section 122 formed at a leading end section of the arm section 120.

A turning shaft 124 (refer to FIG. 1) projecting to the clutch cover 68 side and extending along the axial direction of the clutch cover 68 is formed at a proximal end section of the arm section 120. The turning shaft 124 is inserted in a hole section 126 formed in the clutch cover 68, and hence the clutch plates 70 are turnably supported by the clutch cover 68. Further, a knurled engagement section 128 is formed on an outer peripheral section of the circular-arc section 122.

As illustrated in FIG. 2, the screw 72 includes a threaded section 130 and a pressing section 132 larger in diameter than the threaded section 130. The threaded section 130 is threadedly engaged with a threaded hole 134 formed at a leading end section of the sub-torsion shaft 22. Thereby, the screw 72 is fixed to the leading end section of the sub-torsion shaft 22. Further, in this manner, in a state in which the screw 72 is fixed to the leading end section of the sub-torsion shaft 22, the pressing section 132 is abutted to the leading end section of the sleeve 62. Thereby, movement of the sleeve 62 into a disengaging direction with respect to the sub-torsion shaft 22 is regulated.

Further, as illustrated in FIG. 1, in the above-mentioned clutch guide 64 and the clutch cover 68, respectively formed are hole sections 136 and 138. The leading end section 20B of the trigger wire 20 is inserted in both the hole sections 136 and 138, and hence rotation of the clutch guide 64 is regulated with respect to the clutch cover 68.

Further, in a state in which the rotation of the clutch guide 64 is regulated with respect to the clutch cover 68 as described above, as illustrated in FIG. 4, the cross claw 112 is positioned near an opening section in the coil-spring accommodating section 86 formed in the substantially C-shape. One end section of the coil spring 74 accommodated in the coil-spring accommodating section 86 is supported by the cross claw 112, and another end section of the coil spring 74 is caught (connected) to the coupling wall section 92.

Further, in this state, an interval between the cross claw 112 and the coupling wall section 92 in the circumferential direction is shorter than the entire length of the coil spring 74 which is in a free state, and hence the coil spring 74 is held in a compressed state. As a result, with respect to the clutch guide 64, an urging force is brought into action in one rotational direction.

Meanwhile, in this state, such a state is reached that an interval between the hole section 126 of the clutch cover 68 (the turning shaft 124 of the clutch plate 70) and the coupling wall section 92 is sufficiently secured. The clutch plate 70 is accommodated in the clutch-plate accommodating section 96 so that the engagement section 128 is housed on an inner side relative to an outer rim section of the clutch guide 64. Further, in this state, the coupling wall section 92 is abutted to a leading end section of the circular-arc section 122.

In addition, as illustrated in FIG. 4, the webbing take-up device 10 includes a switching mechanism 142 in addition to the above-mentioned components. The switching mechanism 142 includes a lock ring 144, an engagement member 146, and a gas generator (not shown in the drawings). The lock ring 144 is formed in an annular shape around the clutch guide 64 and the clutch cover 68, and a knurled engagement-subject section 148 engageable with the above-mentioned engagement sections 128 is formed on an inner peripheral section of the lock ring 144.

The engagement member 146 is engaged with an engagement section 150 formed on an outer peripheral section of the lock ring 144. When being activated by receiving an activation signal from an ECU (not shown in the drawings), the gas generator turns the engagement member 146 so as to release an engaged state of the engagement member 146 and the engagement section 150 of the lock ring 144.

In this webbing take-up device 10, the following operation is performed.

In a state in which the webbing belt 12 pulled out from the spool 14 illustrated in FIG. 1 is fitted to a passenger's body, when, for example, a vehicle enters an abrupt deceleration state and a lock mechanism (not shown in the drawings) is actuated, an engagement member (not shown in the drawings) provided to the lock mechanism is engaged with the gear section (an engagement subject section) 36 (refer to FIG. 3) of the lock gear 16 so that rotation of the lock gear 16 is regulated.

Thereby, rotation into the pull out direction of the spool 14 coupled to the lock gear 16 via the main torsion shaft 18 is regulated, and hence pull-out of the webbing belt 12 from the spool 14 is regulated. Accordingly, the passenger's body which is to move forward is restrained by the webbing belt 12.

Further, in a state in which the rotation of the lock gear 16 is regulated, when the webbing belt 12 is pulled, with a further larger force, by the passenger's body and when a rotational force, which is based on this pulling force, of the spool 14 into the pull out direction exceeds mechanical strength of the first energy-absorbing section 48, the first energy-absorbing section 48 is subjected to torsion. As a result, the spool 14 is rotated in the pull-out direction by this torsional amount.

Accordingly, the webbing belt 12 is pulled out from the spool 14 by a rotation amount into the pull-out direction of the spool 14. Thereby, a load (burden) from the webbing belt 12 onto a chest of the passenger is alleviated, and energy for pull of the webbing belt 12 is absorbed by the torsional amount just described above.

Meanwhile, the rotation of the spool 14 into the pull-out direction with respect to the lock gear 16 as described above means relative rotation of the lock gear 16 into the take-up direction with respect to the spool 14. Accordingly, when the lock gear 16 is rotated relatively to the spool 14 into the take-up direction, the proximal end section 20A of the trigger wire 20 is moved in the circumferential direction of the main torsion shaft 18 in accordance therewith, with the leading end side relative to the proximal end section 20A of the trigger wire 20 being inserted in the hole section 52. Thus, the leading end side relative to the proximal end section 20A of the trigger wire 20 is pulled to the lock gear 16 side with respect to the hole section 52.

In this manner, the leading end section 20B of the trigger wire 20 is pulled out from the hole section 136 of the clutch guide 64 and the hole section 138 of the clutch cover 68. As a result, a state is released in which the rotation of the clutch guide 64 with respect to the clutch cover 68 is regulated.

Figure 5:
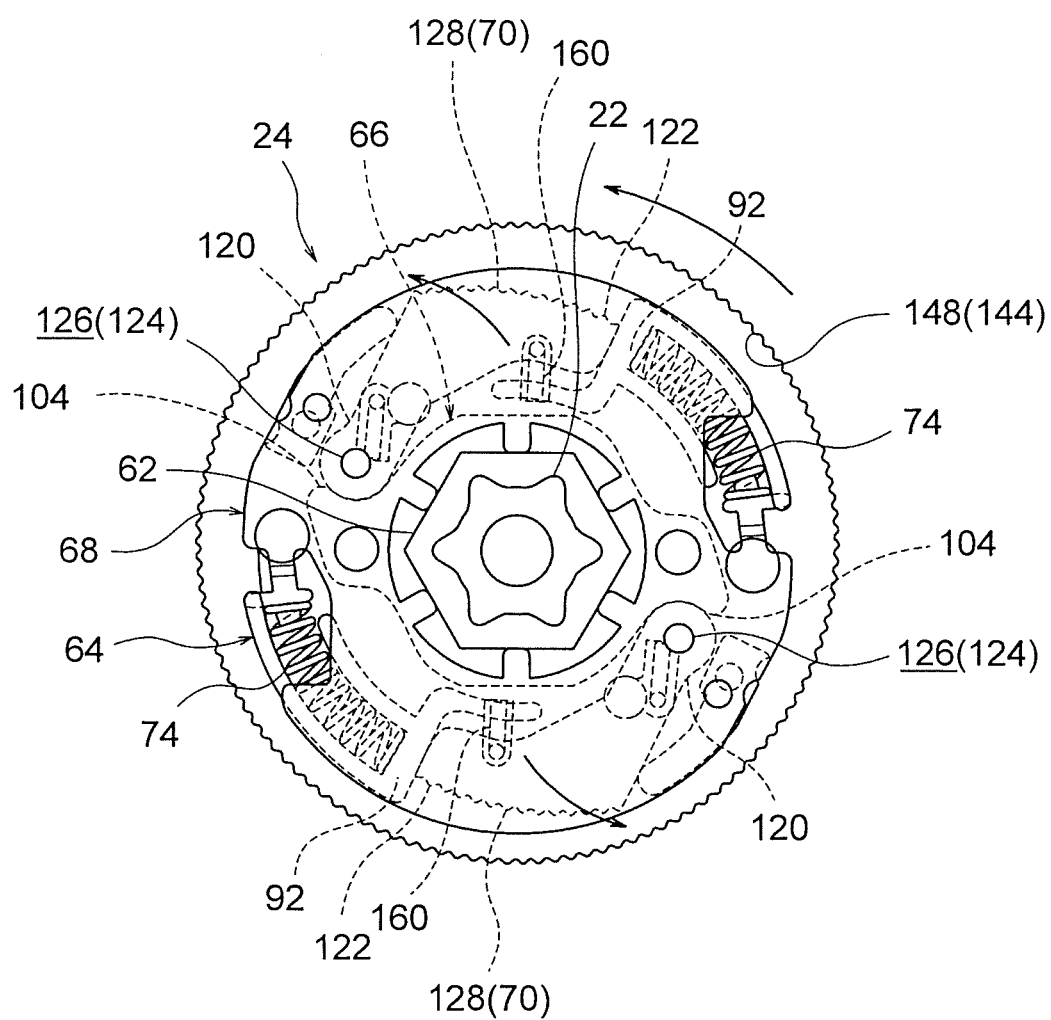
FIG. 5 is an explanatory view of an operation of the clutch mechanism illustrated in FIG. 4, illustrating a state in which a clutch plate has not yet been engaged with a lock ring.

When the urging force of the coil spring 74 causes the clutch guide 64 to be rotated relatively to the clutch cover 68 into the one rotational direction, as illustrated in FIG. 5, the interval between the hole section 126 of the clutch cover 68 (the turning shaft 124 of the clutch plate 70) and the coupling wall section 92 becomes shorter. Thus, the leading end section of the circular-arc section 122 is pressed (guided) by the coupling wall section 92 into a tangential direction of the clutch guide 64. In this manner, the clutch plates 70 are turned to a lock ring 144 side.

Figure 6:
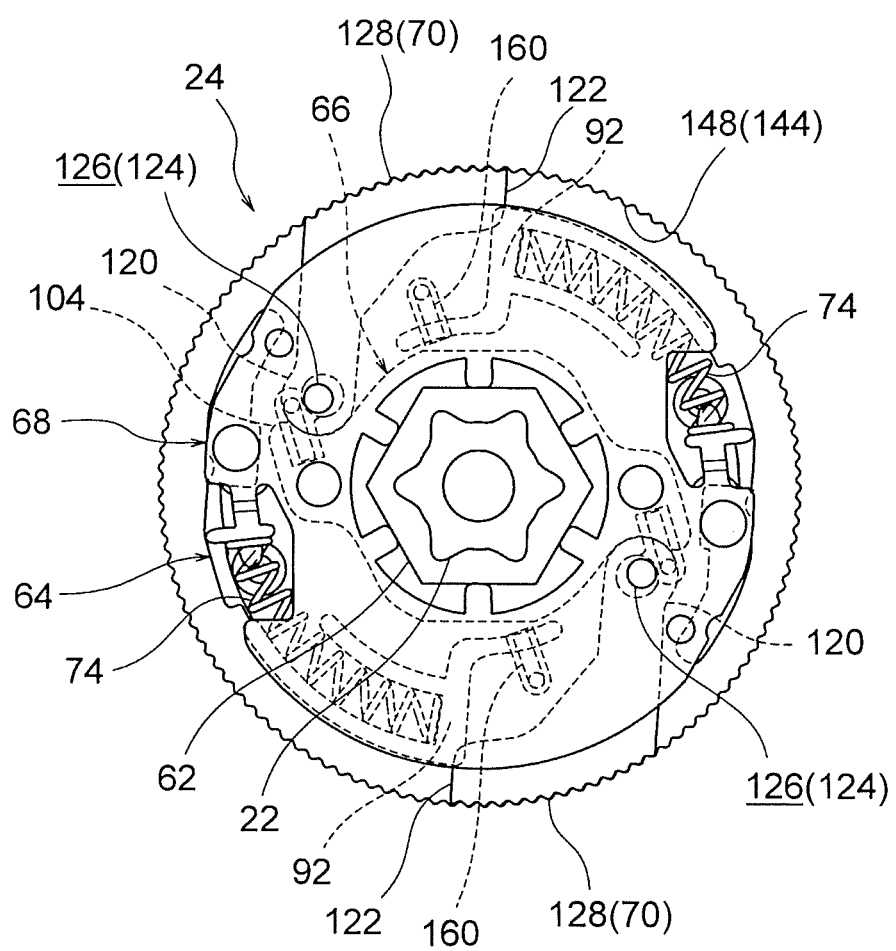
FIG. 6 is an explanatory view of the operation of the clutch mechanism illustrated in FIG. 4, illustrating a state in which the clutch plate has been engaged with the lock ring.

Further, as illustrated in FIG. 6, when the clutch guide 64 is rotated relatively to the clutch cover 68 at a predetermined rotational angle into the one rotational direction, the engagement section 128 of the clutch plate 70 is engaged with the engagement-subject section 148 of the lock ring 144. Further, at this time, the locking section 104 formed at the clutch base 66 is maintained in such a state as to be secured (caught) to the proximal end section of the arm section 120. Accordingly, rotation of the clutch base 66 with respect to the lock ring 144, and rotation of the sleeve 62 is regulated.

Further, in a state in which the rotation of the sleeve 62 is regulated, when the webbing belt 12 illustrated in FIG. 1 is pulled, with a further larger higher force, by the passenger's body and when the rotational force, which is based on this pulling force, of the spool 14 into the pull out direction exceeds mechanical strength of the second energy-absorbing section 60, the second energy-absorbing section 60 is subjected to torsion. As a result, the spool 14 is rotated in the pull out direction by this torsional amount.

Accordingly, the webbing belt 12 is pulled out from the spool 14 by a rotation amount into the drawing-out direction of the spool 14. Thereby, a load (burden) from the webbing belt 12 onto a chest of the passenger is alleviated, and energy for pull of the webbing belt 12 is absorbed by the torsional amount described above.

Meanwhile, prior to actuation of the above-mentioned lock mechanism (not shown in the drawings), when the ECU determines that the body size of the passenger is smaller than a preset reference value based on a signal from a body-size detector (not shown in the drawings), the gas generator (not shown in the drawings) is activated by the ECU.

Then, the gas generator thus activated turns the engagement member 146 illustrated in FIG. 4 so as to release the engaged state of the engagement member 146 and the engagement section 150 of the lock ring 144. Accordingly, in this case, in a state in which the clutch mechanism 24 is actuated, the rotational force of the spool 14 (refer to FIG. 1) is transmitted to the lock ring 144 via the clutch mechanism 24, and hence the lock ring 144 is rotated together with the spool 14 in the pull out direction. Thus, in this state, although torsion occurs in the first energy-absorbing section 48 illustrated in FIG. 1, torsion does not occur in the second energy-absorbing section 60. Therefore, energy absorption by the second energy-absorbing section 60 does not occur.

In other words, in this webbing take-up device 10, according to body sizes of passengers, a mode in which energy is absorbed by the second energy-absorbing section 60 and another mode in which energy is not absorbed by the second energy-absorbing section 60 can be selectively switched.

Incidentally, in the above-mentioned clutch mechanism 24, in order to ensure a rotary movement of the clutch plates 70, it is necessary to secure clearances between the clutch plates 70 and both the clutch guide 64 and the clutch cover 68 respectively. However, in this case, when vibration or the like associated with a vehicle traveling, for example, it causes the clutch plates 70 to repeatedly hit against the clutch guide 64 and/or the clutch cover 68, so there is a possibility to generate the (rattling) noise.

Under the circumstance, the present webbing take-up device 10 further includes the following structure.

Figure 7:
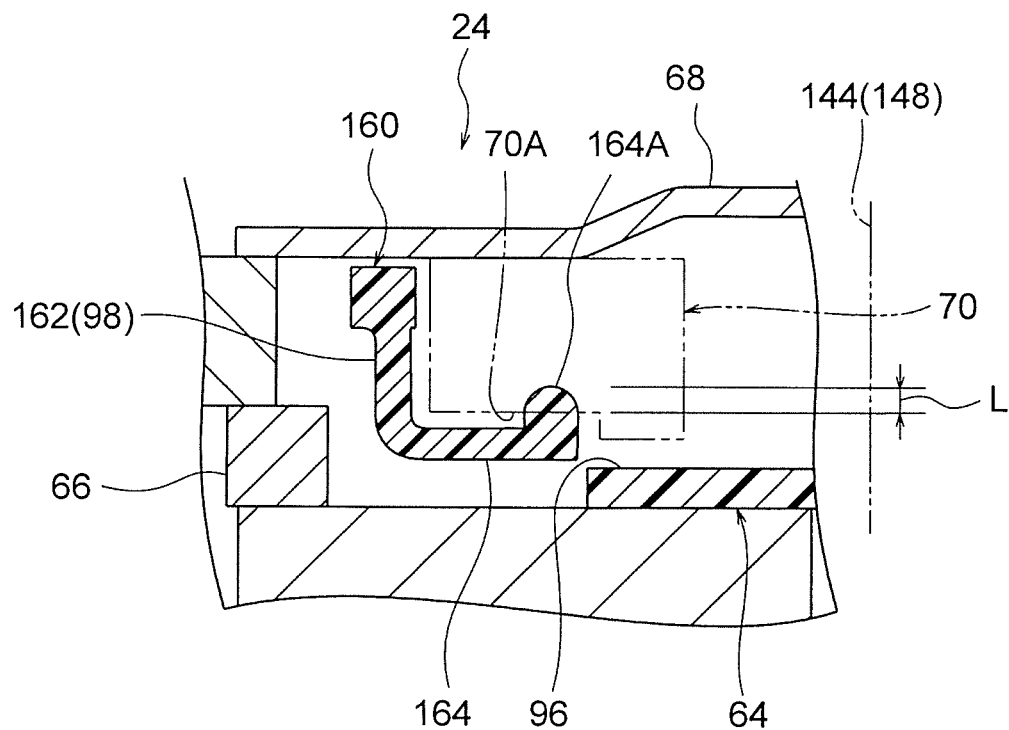
FIG. 7 is a main-part enlarged sectional side view of the clutch mechanism illustrated in FIG. 4, illustrating a state in which an L-shaped spring is not urging the clutch plate.
Figure 8:
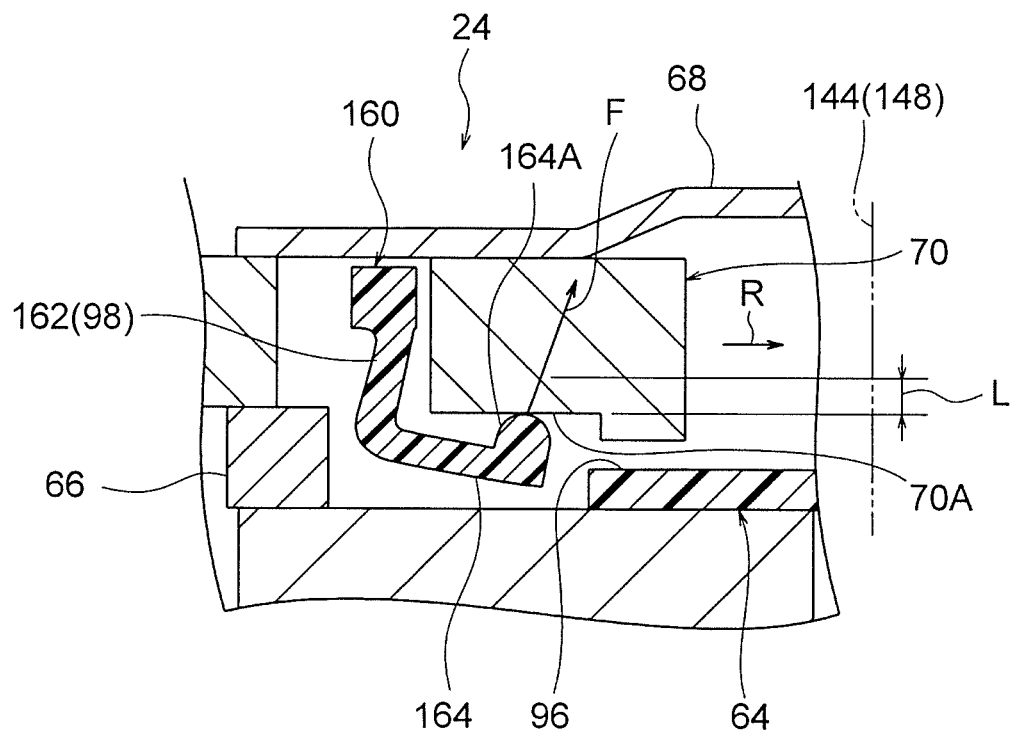
FIG. 8 illustrates a state in which the L-shaped spring is urging the clutch plate in the clutch mechanism illustrated in FIG. 7.

Specifically, in the each above-mentioned first support wall section 98 (refer to FIG. 4), an L-shaped spring 160 is formed integrally therewith. As illustrated in FIGS. 7 and 8, each of the L-shaped springs 160 is formed (constituted) by a part of the first support-wall section 98. The L-shaped spring 160 is constituted by a first arm section 162 which extends from a leading end section of the first support-wall section 98 to a proximal end section side (toward a side opposite to the clutch cover 68) along the axial direction of the clutch guide 64, and a second arm section 164 which extends from a leading end of the first arm section 162 outward in a radial-direction of the clutch guide 64 (into a direction orthogonal to a direction in which the first arm section 162 extends).

The second arm section 164 is positioned on a side opposite to the clutch cover 68 with respect to the clutch plate 70, and as illustrated in FIG. 8, a leading end section 164A of the second arm section 164 is abutted (brought into contact) with a surface (an abut surface (a contact surface) 70A) of the clutch plate 70, which is on a side opposite to the clutch cover 68. Thereby, the clutch plate 70 is urged by the L-shaped spring 160 toward the clutch cover 68 side, in a state of being accommodated in the clutch plate accommodating section 96.

The leading end section 164A of the second arm section 164 is in a form of a protrusion extending from the leading end side of the second arm section 164 toward the clutch cover 68 side.

Note that, as illustrated in FIGS. 7 and 8, a deflection length of the L-shaped spring 160 in a state of urging the clutch plate 70 (a length in the axial direction between a position of the leading end section 164A of the second arm section 164 which is not in urging state and a position of the leading end section 164A of the second arm section 164 which is in urging state) is defined as a length L. Further, as illustrated in FIGS. 5 and 6, the clutch plate 70 is gradually separated from the L-shaped spring 160, when being turned toward the lock ring 144 side. Still further, in FIG. 8, an arrow F indicates a direction of an urging force of the L-shaped spring 160, and an arrow R indicates a turning direction of the clutch plate 70 toward the lock ring 144 side.

Next, a description is made of operation and advantage of the embodiment of the present invention.

In the webbing take-up device 10, when the clutch guide 64 is rotated relatively to the clutch cover 68 into the one rotational direction, in accordance therewith, the clutch plates 70 are turned to the lock ring 144 side to be engaged with the lock ring 144.

As illustrated in FIG. 8, in the clutch guide 64, the L-shaped springs 160 are formed, and the clutch plates 70 are urged by the L-shaped springs 160 toward the clutch cover 68 side in a state of being accommodated in the clutch-plate accommodating sections 96. Accordingly, even though the clearances are formed between the clutch plates 70 and both the clutch cover 68 and the clutch guide 64 respectively in order to ensure the rotary movement of the clutch plates 70, it is possible to suppress the (rattling) noise generated by repeatedly hitting the clutch plates 70 against the clutch cover 68 and/or the clutch guide 64.

In addition, the L-shaped spring 160 is constituted by a part of the first support-wall section 98, and the L-shaped spring 160 is constituted by the first arm section 162 which extends from the leading end section of the first support-wall section 98 to the proximal end section side (toward the side opposite to the clutch cover 68) along the axial direction of the clutch guide 64, and the second arm section 164 which extends from the leading end of the first arm section 162 outward in the radial-direction of the clutch guide 64. Accordingly, in comparison with a linear spring, an equivalent deflection length can be secured with a more compact structure.

Further, the L-shaped springs 160 are formed integrally with the clutch guide 64, and hence it is possible to suppress a cost increase in comparison with a case of using other components.

Next, a description is made of modification of the embodiment of the present invention.

Figure 9:
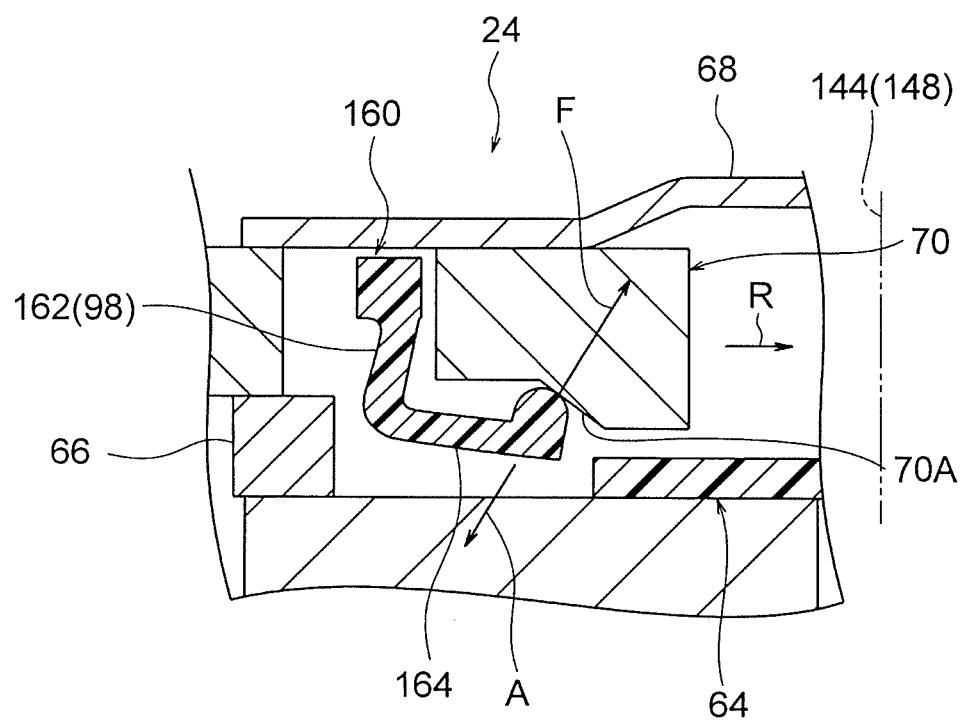
FIG. 9 corresponds to FIG. 8, illustrating a modification of the clutch mechanism according to the embodiments of the present invention.

In the above-mentioned embodiment, the contact surface 70A of the clutch plate 70 contacting with the leading end section 164A of the second arm section 164 is formed along the direction orthogonal to the axial direction of the clutch guide 64. However, as illustrated in FIG. 9, the contact surface 70A may be inclined with respect to the axial direction of the clutch guide 64 so as to be directed to a direction (arrow A direction) opposite to a direction toward the clutch cover 68 side and the lock ring 144 side.

With this structure, the clutch plate 70 can be urged by the L-shaped spring 160 toward the clutch cover 68 side and the lock ring 144 side (the component force toward the lock ring 144 side can be further enhanced). Thus, turning of the clutch plates 70 toward the lock ring 144 side (arrow R direction) can be assisted.

Further, in the above-mentioned embodiment, although the second arm section 164 of the L-shaped spring 160 extends from the leading end of the first arm section 162 outward in the radial-direction of the clutch guide 64, the second arm section 164 of the L-shaped spring 160 may extend from the leading end of the first arm section 162 into the tangential direction of the clutch guide 64. Thereby, the clutch plates 70 may be urged by the L-shaped springs 160 toward the clutch cover 68 side, when being accommodated in the clutch-plate accommodating sections 96.

Hereinabove, although description is made of the embodiments of the present invention, the present invention is not limited to the above description. As a matter of course, the present invention may be carried out in other various modes without departing from the spirit of the present invention.

Further, the embodiments of the present invention is applicable to a clutch for energy absorbing mechanisms in other webbing take-up devices (for example, a retractor in which a lock ring and a frame are integrated with each other so that a webbing-belt load at the time of force limitation (at the time of energy absorption) can be adjusted at two stages).

What is claimed is:

1. A webbing take-up device comprising:
   a spool for taking up a webbing belt;
   a lock unit that is arranged coaxially with the spool, and is fixed to the spool so as to be rotatable integrally with the spool;
   a clutch cover that is arranged coaxially with the lock unit, and is fixed to the lock unit so as to be rotatable integrally with the lock unit;
   a clutch guide that is arranged to face the clutch cover in an axial direction of the lock unit, and is supported at the lock unit so as to be rotatable relatively to the lock unit;
   a lock ring having an engaged section that is formed at an outer side in a radial direction of the clutch cover and the clutch guide;
   a clutch plate that includes a turning shaft extending along an axial direction of the clutch cover, and is supported at the clutch cover by the turning shaft so as to be turnable, the clutch plate being turned toward a side of the engaged section to be engaged with the engaged section while being guided by the clutch guide in accordance with relative rotation of the clutch guide with respect to the clutch cover in one rotational direction; and
   an L-shaped spring that is formed integrally with the clutch guide, the L-shaped spring including a first arm section which extends along an axial direction of the clutch guide, and a second arm section which extends from a leading end of the first arm section in a direction orthogonal to the direction in which the first arm section extends, a leading end section of the second arm section being abutted to the clutch plate to urge the clutch plate to a side of the clutch cover.

2. The webbing take-up device of claim 1, wherein an abutting surface of the clutch plate, to which the leading end section of the second arm section is abutted, is directed to a direction opposite to a direction toward a side of the clutch cover and a side of the engaged section.

* * * * *